United States Patent
Patil et al.

(10) Patent No.: US 10,694,872 B2
(45) Date of Patent: Jun. 30, 2020

(54) POINT OF SALE ARTIFICIAL INTELLIGENCE QUALITY DETERMINATION SYSTEM

(71) Applicants: Amit R. Patil, Naperville, IL (US); Scott Roberts, Seattle, WA (US); Michael Paolella, Lake Zurich, IL (US); Michelangelo Palella, Bartlett, IL (US); Steve E. Trivelpiece, Rancho Santa Margarita, CA (US)

(72) Inventors: Amit R. Patil, Naperville, IL (US); Scott Roberts, Seattle, WA (US); Michael Paolella, Lake Zurich, IL (US); Michelangelo Palella, Bartlett, IL (US); Steve E. Trivelpiece, Rancho Santa Margarita, CA (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 0 days.

(21) Appl. No.: 16/135,872

(22) Filed: Sep. 19, 2018

(65) Prior Publication Data
US 2020/0085214 A1    Mar. 19, 2020

(51) Int. Cl.
*G06Q 20/20* (2012.01)
*G06K 9/00* (2006.01)
(Continued)

(52) U.S. Cl.
CPC .......... *A47F 9/048* (2013.01); *G06K 9/00671* (2013.01); *G06N 20/00* (2019.01); *G06Q 20/208* (2013.01); *G06Q 20/209* (2013.01)

(58) Field of Classification Search
CPC ..... G06Q 20/20; G07G 1/0036; G07G 1/0045
(Continued)

(56) References Cited

U.S. PATENT DOCUMENTS

| 8,963,717 B2 | 2/2015 | Mohiuddin et al. |
| 9,460,597 B1 | 10/2016 | Clark et al. |

(Continued)

FOREIGN PATENT DOCUMENTS

| CN | 106715128 A | 5/2017 |
| CN | 107533029 A | 1/2018 |

(Continued)

OTHER PUBLICATIONS

"Falling Walls Lab 2016—Alexey Yakushenko—Breaking the Wall of Food Waste." Link: https://vimeo.com/191210353 <https://protect-us.mimecast.com/s/QLDRC4xkzXIoLXDxsOW4B5?domain=vimeo.com>.

(Continued)

*Primary Examiner* — Edwyn Labaze
(74) *Attorney, Agent, or Firm* — Arent Fox LLP

(57) ABSTRACT

Systems and methods for operating a Point Of Sale ("POS") system. The methods comprise: performing operations by the POS system to machine learn at least information about a condition of an article to be purchased using at least one of imaging, sensing, and short range communications; determining by the POS system if the article is accepted for purchase based at least on the machine learned information about the condition of the article; and completing a purchase transaction by the POS system if a determination is made that the article is accepted for purchase. The POS system may also perform operations to deactivate a security tag coupled to the article or actuate a detachment mechanism of the security tag, if the article was successfully purchased during the purchase transaction.

21 Claims, 8 Drawing Sheets

(51) Int. Cl.
*A47F 9/04* (2006.01)
*G06N 20/00* (2019.01)

(58) Field of Classification Search
USPC .................................. 235/383, 375, 487
See application file for complete search history.

(56) References Cited

U.S. PATENT DOCUMENTS

| | | | |
|---|---|---|---|
| 9,638,693 B2 | 5/2017 | Wolfrum et al. | |
| 2002/0050526 A1* | 5/2002 | Swartz | G06K 17/00 235/472.02 |
| 2002/0186133 A1* | 12/2002 | Loof | G06Q 20/20 340/572.1 |
| 2003/0075602 A1* | 4/2003 | Wike, Jr. | A47F 9/048 235/383 |
| 2005/0040230 A1* | 2/2005 | Swartz | G06K 17/00 235/383 |
| 2006/0192652 A1* | 8/2006 | Mandava | G06K 7/0008 340/5.8 |
| 2006/0195331 A1* | 8/2006 | Goldthwaite | G06Q 99/00 345/581 |
| 2009/0132174 A1* | 5/2009 | Burke | A22C 29/005 702/19 |
| 2013/0332319 A1* | 12/2013 | Zuber | G06Q 30/0601 705/27.1 |
| 2014/0091932 A1 | 4/2014 | Mohiuddin et al. | |
| 2014/0156423 A1 | 6/2014 | Argue et al. | |
| 2015/0241418 A1 | 8/2015 | Wolfrum et al. | |
| 2016/0300285 A1* | 10/2016 | Gandhi | G06Q 30/0623 |
| 2017/0053506 A1* | 2/2017 | Alexis | G08B 13/246 |
| 2018/0088072 A1 | 3/2018 | Yakushenko et al. | |
| 2018/0207934 A1 | 7/2018 | Yakushenko et al. | |
| 2019/0040273 A1 | 2/2019 | Yakushenko et al. | |
| 2019/0058116 A1 | 2/2019 | Yakushenko et al. | |

FOREIGN PATENT DOCUMENTS

| | | |
|---|---|---|
| CN | 108779354 A | 11/2018 |
| CN | 108780842 A | 11/2018 |
| DE | 102012021222 A1 | 4/2014 |
| DE | 102012021222 B4 | 2/2015 |
| DE | 102014010643 A1 | 1/2016 |
| DE | 102015005781 A1 | 11/2016 |
| DE | 102016002890 A1 | 9/2017 |
| DE | 102016003461 A1 | 9/2017 |
| DE | 102016003770 A1 | 10/2017 |
| DE | 102017005949 A1 | 12/2018 |
| EP | 2911652 A2 | 9/2015 |
| EP | 3169523 A1 | 5/2017 |
| EP | 2911652 B1 | 3/2018 |
| EP | 3295162 A1 | 3/2018 |
| EP | 3426735 A1 | 1/2019 |
| EP | 3433883 A1 | 1/2019 |
| ES | 2670939 T3 | 6/2018 |
| JP | 2016505391 A | 2/2016 |
| JP | 2017527433 A | 9/2017 |
| JP | 2018514777 A | 6/2018 |
| JP | 2019512558 A | 5/2019 |
| JP | 2019514195 A | 5/2019 |
| KR | 20180130489 A | 12/2018 |
| WO | 14063670 A2 | 5/2014 |
| WO | 14063670 A3 | 11/2014 |
| WO | 16008464 A1 | 1/2016 |
| WO | 16180385 A1 | 11/2016 |
| WO | 17054792 A1 | 4/2017 |
| WO | 17152892 A1 | 9/2017 |
| WO | 17162222 A1 | 9/2017 |
| WO | 18233735 A1 | 12/2018 |
| WO | 18233736 A1 | 12/2018 |

OTHER PUBLICATIONS

International Search Report and Written Opinion for corresponding International Application No. PCT/US2019/050811 dated Dec. 3, 2019.

* cited by examiner

POINT OF SALE ARTIFICIAL INTELLIGENCE QUALITY DETERMINATION SYSTEM

BACKGROUND

Statement of the Technical Field

The present disclosure relates generally to computing systems. More particularly, the present disclosure relates to implementing systems and methods for providing a Point Of Sale ("POS") Artificial Intelligence ("AI") quality determination system.

DESCRIPTION OF THE RELATED ART

Billions of dollars are lost each year to expired, damaged, and spoiled food items. Lots of companies are coming up with ways to track this for the consumer. However, these solutions are relatively expensive since they require store personnel assistance.

SUMMARY

The present disclosure concerns implementing systems and methods for operating a POS system. The method comprises: performing operations by the POS system to machine learn at least information about a condition of an article to be purchased using at least one of imaging, sensing, and short range communications; determining by the POS system if the article is accepted for purchase based at least on the machine learned information about the condition of the article; and completing a purchase transaction by the POS system if a determination is made that the article is accepted for purchase. The purchase transaction can be completed by communicating article information and payment information from a POS station to a remote transaction system via a network connection. The POS system may also perform operations to deactivate a security tag coupled to the article or actuate a detachment mechanism of the security tag, if the article was successfully purchased during the purchase transaction.

In some scenarios, the machined learned information indicates whether the article is at least one of damaged, expired and spoiled. The determination is made that the item is accepted for purchase when the machined learned information indicates that the article is not one or more of damaged, expired and spoiled. Additionally or alternatively, operations are performed by the POS system to machine learn an identity of a person purchasing the article. The person's identity is used to by the POS system to determine whether the person is allergic to the article. The article is accepted for purchase when a determination is made that the person is not allergic to the article.

In those or other scenarios, the machined learned information specifies the article's appearance. The article is accepted for purchase when the article's appearance matches that described by a given product description. Additionally or alternatively, a flag is set for providing access to at least one of a product description for the article, an expiration date for the article, and tag sensor data associated with the article to the purchaser of the article via a receipt or electronic message, when the article is accepted for purchase.

BRIEF DESCRIPTION OF THE DRAWINGS

The present solution will be described with reference to the following drawing figures, in which like numerals represent like items throughout the figures.

DETAILED DESCRIPTION

Figure 1:
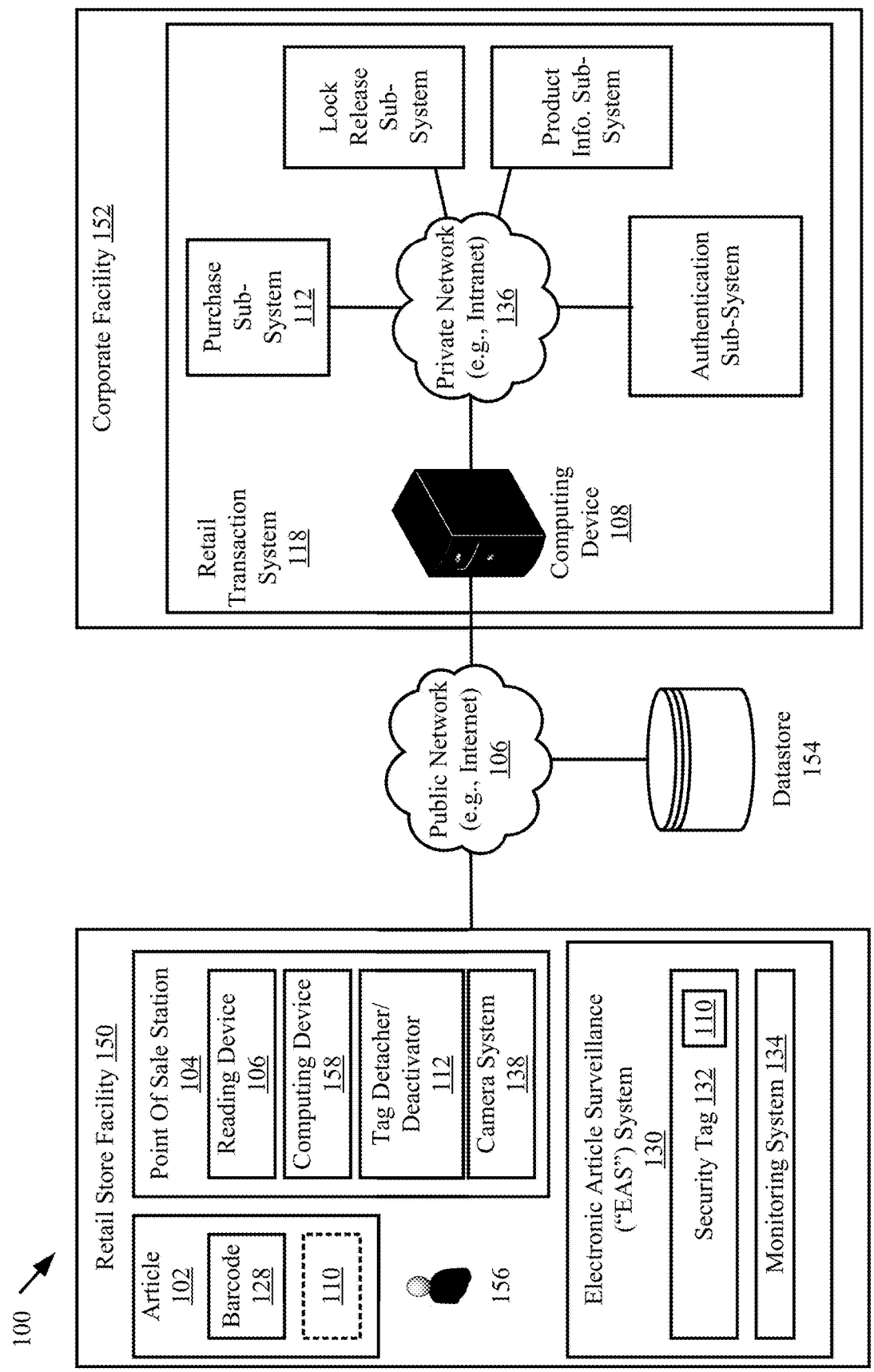
FIG. 1 is an illustration of an illustrative system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

In retail stores, there is a need for an improved way to purchase items without the need of a store employee's assistance. Accordingly, the present solution provides an automated POS process implementing AI. With the advent of Radio Frequency Identification ("RFID"), smart sensing tags, AI cameras and cloud databases with product history, it is now possible to perform most of the checking at a POS station before the customer leaves the store. This would improve customer satisfaction because the customers would find out that the perishable item had expired before they bought it or is about to expire in a relatively short amount of time. The stores would lower costs by not having to handle so many returns and customer complaints.

As noted above, multiple systems are used to improve the purchase transaction process and to verify the authenticity and quality of the products being purchased. These systems comprise cameras. Cameras have improved in quality and price over the years. In addition, AI and machine learning allow cameras to: identify a person and/or payment means (e.g., credit card); determine the state or condition of a product being purchased; and/or determine the authenticity of the product being purchased. Furthermore, storing data associated with past purchases and about the sold products allow companies to verify the validity of the product if returned.

The present solution covers a number of different methods that can be used to check the quality and history of products as they are sold at POS stations or self-checkout areas. Any one of these methods or all of them can be implemented depending on cost constraints and customer needs. A first method uses a camera system with AI to perform the following checks: check that a pre-stored code (e.g., a SKU) for a given product matches a barcode or RFID tag just read at the POS station; check that the product is not damaged or spoiled; and/or check the expiration date to make sure that it has not passed or is not going to occur in the near future.

A second method uses an RFID reader to read unique RFID data from any attached RFID tags. The unique RFID data is then used to obtain historical information associated with a respective product. This historical data comprises an expiration date and product description. The historical data is compared with results of an image analysis to determine if the expiration data shown in an image of the product matches that specified in the historical information and to determine if the products appearance in the image matches that described by the product description. If the expiration date shown in an image of the product matches that specified in the historical information and/or the products appearance in the image matches that described by the product description, then a link to the product description, expiration data and/or other product related information can be provided on the receipt or in an email to the customer. If the customer is known and has allowed their medical data to be accessed, then the medical data and product information is used to check for allergies. If allergies exist, then an action can be taken at the POS station to inform the customer of the same prior to any purchase. If the RFID tag is a smart tag with sensors, then the temperature history and spoilage data for the product could also be added to the receipt or email to the customer.

A third method uses a Near Field Communication ("NFC") smart sensor to read information from the tag. Any NFC technology can be used herein (e.g., Bluethooth and/or 13.56 MHz technology). If the tag is a smart tag with sensors, then the temperature history and spoilage data for the product could be added to the receipt. Additionally or alternatively, chemical sensor data could be displayed.

The above three methods could be checked in real-time and used to alert store employees. Customers could be informed about any issues relating to a product, and have replacement products sent to the POS immediately. In addition, barcodes codes, links to cloud databases, and status of the products could be added to the receipt or sent to the customer electronically for them to reference in the future.

The present solution will now be described in relation to the purchase of items. The present solution is not limited in this regard. The present solution can also be used in loaned or borrowed item applications.

Referring now to FIG. 1, there is provided a schematic illustration of an illustrative system 100. System 100 is generally configured to facilitate the purchase of articles 102 and/or the return of purchased articles. The articles are also referred to herein as items and/or products. The articles include perishable items (e.g., food) and/or non-perishable items (e.g., apparel, appliances, automotive parts, beauty supplies, personal care items, books, consumer electronics, entertainment tickets, fashion accessories, footwear, office supplies, sports equipment, toys, video games, watches, glasses and/or jewelry).

System 100 comprises a retail store facility 150 including an EAS 130. EASs are well known in the art, and therefore will not be described in detail herein. Any known or to be known EAS can be used herein without limitation. In some scenarios, the EAS 130 comprises a monitoring system 134 and at least one security tag 132. Although not shown in FIG. 1, the security tag 132 is attached to article 102, thereby protecting the article 102 from an unauthorized removal from the retail store facility 150. The monitoring system 134 establishes a surveillance zone (not shown) within which the presence of the security tag 132 can be detected. The surveillance zone is established at an access point (not shown) for the retail store facility 150. If the security tag 132 is carried into the surveillance zone, then an alarm is triggered to indicate a possible unauthorized removal of article 102 from the retail store facility 150.

During store hours, a customer (not shown) may desire to purchase the article 102. Accordingly, system 100 also comprises one or more optional Point Of Sale ("POS") stations 104. POS stations are well known in the art, and therefore will not be described herein. Any known or to be known POS station can be used herein without limitation. The POS station includes a fixed POS station (e.g., a traditional checkout counter), a self-checkout kiosk, or a mobile POS (e.g., a smart phone). The POS station(s) is(are) generally configured to facilitate the initiation of a purchase transaction and the completion of the same. In some scenarios, a conventional POS station is modified to implement machine learning algorithms. Machine learning algorithms are well known in the art, and therefore will not be described herein. Any known or to be known machine learning algorithm can be used herein without limitation. Supervised machine learning algorithm(s), unsupervised machine learning algorithm(s) and/or semi-supervised machine learning algorithm(s) are employed by POS station 104. In this regard, hardware and/or software is provided with a POS station that is configured to learn features/characteristics of a purchaser, learn patterns of movement of the purchaser, and/or learn features/characteristics/conditions of a purchased item. The learned information is stored in a datastore 154 for later use in an item return process. Datastore 154 can include, but is not limited to, a database.

The customer can purchase the article 102 using the POS station 104. A retail transaction application executing on a computing device 158 of the POS station 104 facilitates the exchange of data between the article 102, security tag 132, customer, store associate (not shown) and/or Retail Transaction System ("RTS") 118 of a corporate facility 152. For example, after the retail transaction application is launched, a store associate is prompted to start a retail transaction process for purchasing the article 102. The retail transaction process can be started simply by performing a user software interaction, such as depressing a key on a keypad of the computing device 158 or touching a button on a touch screen display of the computing device 158.

Once the retail transaction process is started, machine learning technology can be used to determine if one or more articles 102 are accepted for purchase. In this regard, a user 156 (e.g., store associate or customer) may manually input into the retail transaction application article information. Alternatively or additionally, the user 156 may place a reading device 106 of the POS station 104 in proximity of article 102. The reading device 106 can include, but is not limited to, an RFID reader, an SRC device, and/or a barcode reader. Each of the listed devices are well known in the art, and therefore will not be described herein. Any known or to be known RFID reader, RC device and/or barcode reader can be used herein without limitation. As a result of this placement, the POS station 104 obtains article information from the article 102. The article information includes any information that is useful for purchasing the article 102, such as an article identifier and an article purchase price. In some scenarios, the article information may even include an identifier of the security tag 132 attached thereto. The article information can be communicated from the article 102 to the reading device of the POS station 104 via a short range communication, such as a barcode communication or a Near Field Communication ("NFC").

In the barcode scenario, article 102 has a barcode 128 attached to an exposed surface thereof. The term "barcode", as used herein, refers to a pattern or symbol that contains embedded data. Barcodes may include, for example, one-dimensional barcodes, two dimensional barcodes (such as matrix codes, Quick Response ("QR") codes, Aztec codes and the like), or three-dimensional bar codes. The embedded data can include, but is not limited to, a unique identifier of the article 102 and/or a purchase price of article 102. The barcode 128 is read by a barcode scanner/reader 106 of the POS station 104. Barcode scanners/readers are well known in the art. Any known or to be known barcode scanner/reader can be used herein without limitation.

In the NFC scenarios, article 102 may comprise an NFC enabled device 110. The NFC enabled device 110 can be separate from security tag 132 or comprise security tag 132. An NFC communication occurs between the NFC enabled device 110 and the handheld device 106 over a relatively small distance (e.g., N centimeters or N inches, where N is an integer such as twelve). The NFC communication may be established by touching components 102, 106 together or bringing them in close proximity such that an inductive coupling occurs between inductive circuits thereof. In some scenarios, the NFC operates at 13.56 MHz and at rates ranging from 106 kbit/s to 848 kbit/s. The NFC may be achieved using NFC transceivers configured to enable contactless communication at 13.56 MHz. NFC transceivers are well known in the art, and therefore will not be described in detail herein. Any known or to be known NFC transceivers can be used herein without limitation.

After the POS station 104 obtains the article information, operations are performed to determine if the article is accepted for purchase. This decision is made based on machine learned information about the article, such as the article's condition (e.g., damaged, spoiled, expired, impending expiration, etc.) and/or appearance (e.g., does the item's appearance match that described by a product description associated with a code read from the article's barcode or security tag).

If the article(s) has(have) been accepted for purchase, then payment information is input into or obtained by (e.g., via customer account information) the retail transaction application of POS station 104. In response to the reception of the payment information, the POS station 104 automatically performs operations for establishing a retail transaction session with the RTS 118. The retail transaction session can involve: communicating the article information and payment information from the POS station 104 to the RTS 118 via a public network 106 (e.g., the Internet); completing a purchase transaction by the RTS 118; and communicating a response message from the RTS 118 to the POS station 104 indicating that the article 102 has been successfully or unsuccessfully purchased. The purchase transaction can involve using an authorized payment system, such as a bank Automatic Clearing House ("ACH") payment system, a credit/debit card authorization system, or a third party system (e.g., PayPal®, SolidTrust Pay® or Google Wallet®).

The purchase transaction can be completed by the RTS 118 using the article information and payment information. In this regard, such information may be received by a computing device 108 of the RTS 118 and forwarded thereby to a sub-system of a private network 100 (e.g., an Intranet). For example, the article information and purchase information can also be forwarded to and processed by a purchase sub-system 112 to complete a purchase transaction. When the purchase transaction is completed, a message is generated and sent to the POS station 104 indicating whether the article 102 has been successfully or unsuccessfully purchased.

If the article 102 has been successfully purchased, then a security tag detaching process can be started. During the security tag detaching process, a security tag detacher 112 of the POS station 104 is used to cause actuation of a detaching mechanism (e.g., a clamp inside the tag which secures a portion of a lanyard or a pin therein as known in the art) of the security tag 132. Once the security tag 132 has been detached from article 102, the customer 140 can carry the article 102 through the surveillance zone without setting off the alarm.

The present solution is not limited to the architecture shown in FIG. 1. In this regard, it should be understood that system 100 can include more or less components than that shown in FIG. 1. For example, in some scenarios, system 100 also comprises a printer for generating paper receipts. The paper receipts can be provided with a link for accessing product information, expiration information, tag sensor information and/or any other product related information that might be of interest to the customer. This information can also be included in an electronic receipt or other electronic message sent to the customer Referring now to FIG. 2, there is provided a schematic illustration of an illustrative architecture for security tag 132. Security tag 132 can include more or less components than that shown in FIG. 2. However, the components shown are sufficient to disclose an illustrative embodiment implementing the present solution. Some or all of the components of the security tag 132 can be implemented in hardware, software and/or a combination of hardware and software. The hardware includes, but is not limited to, one or more electronic circuits.

Figure 2:
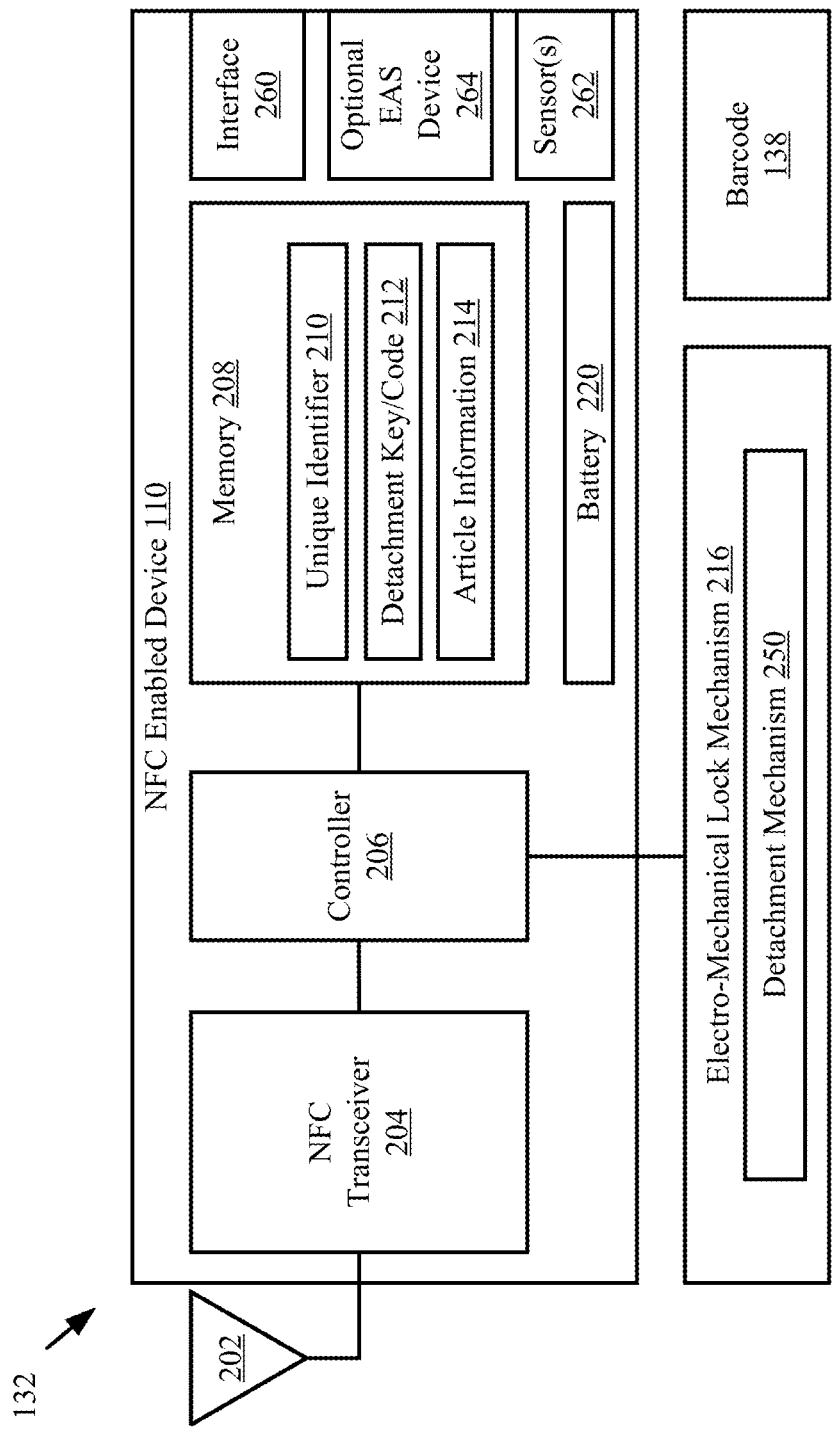
FIG. 2 is a schematic illustration of an exemplary security tag.

The hardware architecture of FIG. 2 represents an illustration of a representative security tag 132 configured to facilitate (a) the purchase of an article from a retail store facility (e.g., retail store facility 150 of FIG. 1) using machine learning technology and/or (b) the prevention of an unauthorized removal of an article (e.g., article 102 of FIG. 1) from a retail store facility (e.g., retail store facility 150 of FIG. 1). In this regard, the security tag 132 may have a barcode 128 affixed thereto for allowing data to be exchanged with an external device (e.g., MCD 104 of FIG. 1) via barcode technology.

The security tag 132 also comprises an antenna 202 and an NFC enabled device 110 for allowing data to be exchanged with the external device via NFC technology. The antenna 202 is configured to receive NFC signals from the external device and transmit NFC signals generated by the NFC enabled device 110. The NFC enabled device 110 comprises an NFC transceiver 204. NFC transceivers are well known in the art, and therefore will not be described herein. However, it should be understood that the NFC transceiver 204 processes received NFC signals to extract information therein. This information can include, but is not limited to, a request for certain information (e.g., a unique identifier 210 and/or article information 214), and/or a message including information specifying a detachment key or code for detaching the security tag 132 from an article. The NFC transceiver 204 may pass the extracted information to the controller 206.

If the extracted information includes a request for certain information, then the controller 206 may perform operations to retrieve a unique identifier 210 and/or article information 214 from memory 208. The article information 214 can include a unique identifier of an article, a product description for the article, and/or a purchase price of the article. The retrieved information is then sent from the security tag 132 to a requesting external device (e.g., MCD 104 of FIG. 1) via an NFC communication.

In contrast, if the extracted information includes information specifying a one-time-only use key and/or instructions for programming the security tag 132 to actuate a detachment mechanism 250 of an electro-mechanical lock mechanism 216, then the controller 206 may perform operations to simply actuate the detachment mechanism 250 using the one-time-only key. Alternatively or additionally, the controller 206 can: parse the information from a received message; retrieve a detachment key/code 212 from memory 208; and compare the parsed information to the detachment key/code to determine if a match exists therebetween. If a match exists, then the controller 206 generates and sends a command to the electro-mechanical lock mechanism 216 for actuating the detachment mechanism 250 (e.g., a mechanical latch, a mechanical clip, a mechanical clamp, etc.). An auditory or visual indication can be output by the security tag 132 when the detachment mechanism 250 is actuated. If a match does not exist, then the controller 206 may generate a response message indicating that detachment key/code specified in the extracted information does not match the detachment key/code 212 stored in memory 208. The response message may then be sent from the security tag 132 to a requesting external device (e.g., POS station 104 of FIG. 1) via a wireless short-range communication or a wired communication via interface 260. A message may also be communicated to another external device or network node via interface 260.

In some scenarios, the connections between components 204, 206, 208, 216, 260 are unsecure connections or secure connections. The phrase "unsecure connection", as used herein, refers to a connection in which cryptography and/or tamper-proof measures are not employed. The phrase "secure connection", as used herein, refers to a connection in which cryptography and/or tamper-proof measures are employed. Such tamper-proof measures include enclosing the physical electrical link between two components in a tamper-proof enclosure.

Notably, the memory 208 may be a volatile memory and/or a non-volatile memory. For example, the memory 208 can include, but is not limited to, a Random Access Memory ("RAM"), a Dynamic Random Access Memory ("DRAM"), a Static Random Access Memory ("SRAM"), a Read-Only Memory ("ROM") and a flash memory. The memory 208 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

The electro-mechanical lock mechanism 216 is operable to actuate the detachment mechanism 250. The detachment mechanism 250 can include a lock configured to move between a lock state and an unlock state. Locks are well known in the art, and therefore will not be described herein. Any known or to be known lock can be used herein without limitation. The electro-mechanical lock mechanism 216 is shown as being indirectly coupled to NFC transceiver 204 via controller 206. The invention is not limited in this regard. The electro-mechanical lock mechanism 216 can additionally or alternatively be directly coupled to the NFC transceiver 204. One or more of the components 204, 206 can cause the lock of the detachment mechanism 250 to be transitioned between states in accordance with information received from an external device (e.g., MCD 104 of FIG. 1). The components 204-208, 260 and a battery 220 may be collectively referred to herein as the NFC enabled device 110.

The NFC enabled device 110 can be incorporated into a device which also houses the electro-mechanical lock mechanism 216, or can be a separate device which is in direct or indirect communication with the electro-mechanical lock mechanism 216. The NFC enabled device 110 is coupled to a power source. The power source may include, but is not limited to, battery 220 or an A/C power connection (not shown). Alternatively or additionally, the NFC enabled device 110 is configured as a passive device which derives power from an RF signal inductively coupled thereto.

As shown in FIG. 2, the security tag 132 also comprises one or more sensors 262. The sensors 262 can facilitate the detection of food spoilage. In this regard, the sensors include, but are not limited to, temperature sensors, moisture sensors, chemical sensors, motion sensors, texture sensors, color sensors, odor sensors, bacteria sensors, mold sensors, and/or yeast sensors.

An Electronic Article Surveillance ("EAS") device may also be provided with the security tag 132. EAS devices are well known in the art, and therefore will not be described herein. Any known or to be known EAS device can be used herein without limitation. For example, in some scenarios, an Acousto-Magnetic ("AM") based EAS device is employed to facilitate theft prevention of the article to which the security tag is coupled. The AM based EAS device can be deactivated by the tag detacher/deactivator 112 of the POS station 104. Techniques for deactivating EAS tags are well known in the art, and therefore will not be described herein. Any known or to be known technique for deactivating EAS tags can be used herein without limitation based on the particulars of a given application. For example, a magnetic field is applied to the EAS device so as to deactivate the same.

Figure 3:
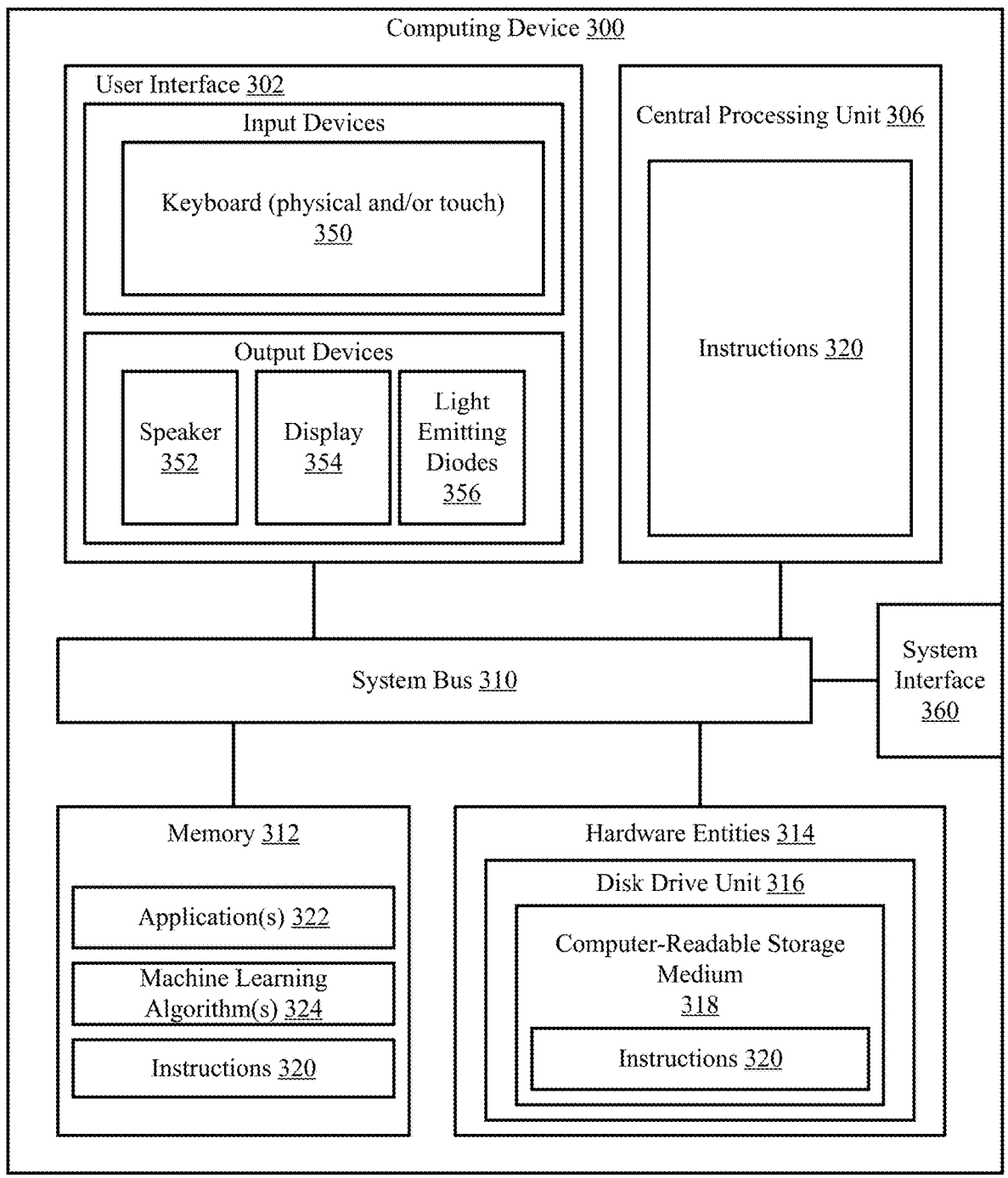
FIG. 3 is an illustration of an illustrative computing device.

Referring now to FIG. 3, there is provided an illustration of an illustrative architecture for a computing device 300. Computing device 108, 158 of FIG. 1 is(are) the same as or similar to computing device 300. As such, the discussion of computing device 300 is sufficient for understanding this component of system 100.

In some scenarios, the present solution is used in a client-server architecture. Accordingly, the computing device architecture shown in FIG. 3 is sufficient for understanding the particulars of client computing devices and servers.

Computing device 300 may include more or less components than those shown in FIG. 3. However, the components shown are sufficient to disclose an illustrative solution implementing the present solution. The hardware architecture of FIG. 3 represents one implementation of a representative computing device configured to provide an improved item return process, as described herein. As such, the computing device 300 of FIG. 3 implements at least a portion of the method(s) described herein.

Some or all components of the computing device 300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the computing device 300 comprises a user interface 302, a Central Processing Unit ("CPU") 306, a system bus 310, a memory 312 connected to and accessible by other portions of computing device 300 through system bus 310, a system interface 360, and hardware entities 314 connected to system bus 310. The user interface can include input devices and output devices, which facilitate user-software interactions for controlling operations of the computing device 300. The input devices include, but are not limited, a physical and/or touch keyboard 350. The input devices can be connected to the computing device 300 via a wired or wireless connection (e.g., a Bluetooth® connection). The output devices include, but are not limited to, a speaker 352, a display 354, and/or light emitting diodes 356. System interface 360 is configured to facilitate wired or wireless communications to and from external devices (e.g., network nodes such as access points, etc.).

At least some of the hardware entities 214 perform actions involving access to and use of memory 212, which can be a Random Access Memory ("RAM"), a disk driver and/or a Compact Disc Read Only Memory ("CD-ROM"). Hardware entities 214 can include a disk drive unit 216 comprising a computer-readable storage medium 218 on which is stored one or more sets of instructions 220 (e.g., software code) configured to implement one or more of the methodologies, procedures, or functions described herein. The instructions 220 can also reside, completely or at least partially, within the memory 212 and/or within the CPU 206 during execution thereof by the computing device 200. The memory 212 and the CPU 206 also can constitute machine-readable media. The term "machine-readable media", as used here, refers to a single medium or multiple media (e.g., a centralized or distributed database, and/or associated caches and servers) that store the one or more sets of instructions 220. The term "machine-readable media", as used here, also refers to any medium that is capable of storing, encoding or carrying a set of instructions 220 for execution by the computing device 200 and that cause the computing device 200 to perform any one or more of the methodologies of the present disclosure.

Computing device 300 implements machine learning technology. In this regard, computing device 300 runs one or more software applications 322 for facilitating the purchase of articles based on machine learned information thereabout. The software algorithms 322 use machine learning algorithms 324 to learn characteristics of people associated with purchase transactions, learn characteristics of credit cards used for payment during the purchase transactions, learn conditions (e.g., damaged, spoiled, expired, etc.) of articles at the time of purchase, and/or learn characteristics of original real non-counterfeit articles (e.g., stitching, material, etc.). This learned information can be used for various purposes as described herein. For example, an image of a person returning an item can be captured and processed to extract features of the person. The extracted features are compared to learned features of a person associated with the purchase transaction for the item and/or credit card used to purchase the item. The learned features were obtained using sensor data obtained during the purchase transaction (e.g., captured images). Alternatively or additionally, the authenticity of an item being purchased can be determined based on the learned characteristics of the item and known product descriptions so as to prevent sweathearting or other thefts. The present solution is not limited to the particulars of this example.

Referring now to FIG. 4, there is provided a flow diagram of an illustrative method 400 for operating a POS system (e.g., POS system 100 or FIG. 1). Method 400 comprise a plurality of operations 401-482. The present solution is not limited to the order of the operations 401-482 shown in FIG. 4. Some or all of the operations of 401-482 can be performed in the same or different order than that shown in FIG. 4. Also, one or more of the operations 401-482 can be eliminated from method 400 in accordance with a given application. For example, if the article is a non-perishable item (e.g., a piece of clothing), then method 400 can be absent of at least operations 424-438.

Figure 4A:
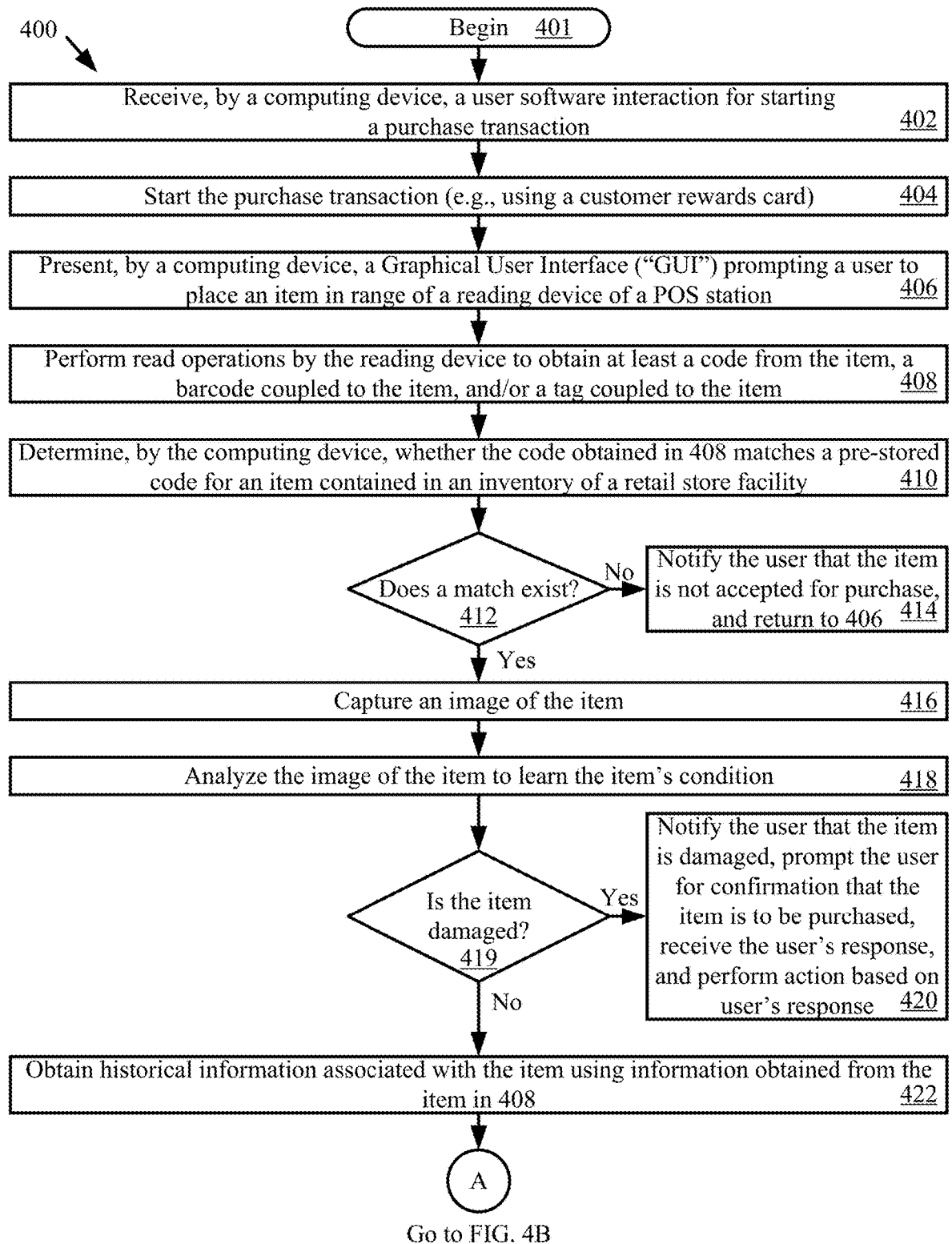
FIGS. 4A-4D (collectively referred to as "FIG. 4") provide a flow diagram of an illustrative method for operating a Point Of Sale ("POS") system.

As shown in FIG. 4A, method 400 begins with 401 and continues with 402 where a computing device (e.g., computing device 158 of FIG. 1 and/or computing device 300 of FIG. 3) receives a user software interaction for starting a purchase transaction. The computing device can include, but is not limited to, a stationary POS device, a mobile POS device, a smart phone, or other electronic purchase transaction device. The user software interaction can include, but is not limited to, the selection of an item from a drop down menu or the depression of a virtual button presented on a display (e.g., display 354 of FIG. 3) of the computing device. In response to the user software interaction, a purchase transaction is started in 404.

In some scenarios, 402-404 involve: receiving authentication information (e.g., a user name, a password, or biometric information) from a user (e.g., store personnel 156 of FIG. 1 or a customer) thereof. The authentication information is used for authenticating the user. Methods for authenticating users based on authentication information are well known in the art. Any known or to be known method for authenticating a user can be used herein without limitation. After authenticating the user, the computing device launches a retail transaction application (e.g., application 322 of FIG. 3) configured to facilitate the purchase of one or more articles (e.g., article 102 of FIG. 1) from an RSF (e.g., RSF 150 of FIG. 1). The retail transaction application can be a pre-installed application, add-on application, or a plug-in application. The retail transaction application can be downloaded to the computing device via a website or other electronic data transfer means prior to step 402. In some scenarios, the retail transaction application is launched in response to a user-software interaction. For example, the retail transaction application is launched in response to a person's interaction with a product via a barcode scan, an NFC scan, QR code scan of a price tag or product ID tag. In other scenarios, the retail transaction application is launched automatically in response to user authentication. Thereafter, the computing device receives a user input to start a retail transaction process for purchasing an article (e.g., article 102 of FIG. 1). In this regard, a GUI can be presented to the user of the MCD. The GUI may include a prompt for a user-software interaction for beginning a retail purchase process. The present solution is not limited to the particulars of this scenario.

Referring again to FIG. 4A, a customer rewards card can be scanned or customer account information can be manually entered into the system during 404. The customer rewards card and account information is used to associate a particular customer account to the purchase transaction. Rewards cards and customer account information are well known in the art, and therefore will not be described herein. Notably, the rewards cards and customer account information comprises information that is useful for identifying one or more customers. The customer identification(s) are useful for various reasons. For example, the customer identification(s) can be used to machine learn whether (s)he is allergic to a product being purchased, as discussed below. The present solution is not limited in this regard. Additionally or alternatively, the POS system can capture an image of the person trying to buy the item, and perform image analysis to learn the person's identity. The learned person's identity may then be used for various purposes (e.g., to verify that the person at the POS station is indeed the person associated with a given customer account, and/or to learn whether the person is allergic to the product being purchased).

Next in 406, the computing device presents a Graphical User Interface ("GUI") prompting the user (e.g., user 156 of FIG. 1) to place an item (e.g., article 102 of FIG. 1) in range of a reading device of a POS station (e.g., POS station 104 of FIG. 1). Read operations are performed in 408 by a reading device (e.g., reading device 106 of FIG. 1) of the POS station. The reading device can include, but is not limited to, a camera, a barcode scanner, and/or an RFID tag reader. The read operations are performed to obtain at least a code (e.g., unique identifier 210 of FIG. 2) from the item, a barcode coupled to the item, and/or a security tag coupled to the item. The code can include, but is not limited to, a SKU or a Universal Product Code ("UPC").

In 410, a determination is made as to whether or not the code read in 408 matches a pre-stored code for an item contained in an inventory of an RSF (e.g., RSF 150 of FIG. 1). If a match does not exist [412:NO], then 414 is performed where the user is notified that the item is not accepted for purchase and where method 400 returns to 406. This notification can include, but is not limited to, an electronic message displayed on the display screen (e.g., display 354 of FIG. 3) of the computing device, an auditory sound output from a speaker (e.g., speaker 352 of FIG. 3) of the computing device, and/or a visual indicator provided by an LED (e.g., LED 356 of FIG. 3) of the computing device.

If a match does exist [412:YES], then 416-420 are performed. 416-418 involve: capturing at least one image of the item (e.g., by camera system 138 of FIG. 1 which may comprise one or more cameras to capture images of one or more sides of the item); analyzing the image(s) of the item by the computing device to learn the item's condition; and detecting any damage to the item based on its machine learned condition. If damage is not detected [419:NO], then method 400 continues with 422 which will be discussed below. If damage is detected by the computing device [419:YES], then 420 is performed where the user is notified that the item is damaged. This notification can include, but is not limited to, an electronic message displayed on the display screen (e.g., display 354 of FIG. 3) of the computing device, an auditory sound output from a speaker (e.g., speaker 352 of FIG. 3) of the computing device, and/or a visual indicator provided by an LED (e.g., LED 356 of FIG. 3) of the computing device. The user is also prompted via the GUI for confirmation that the item is to be purchased. An action is taken by the computing device based on the user's response to the prompt. For example, if the user confirms the item's purchase, then method 400 may continue with 422. 422 involves obtaining historical information associated with the item using information obtained from the item in 408. In contrast, if the user does not confirm the item's purchase, then method 400 may return to 406 or the purchase transaction is terminated.

Figure 4B:
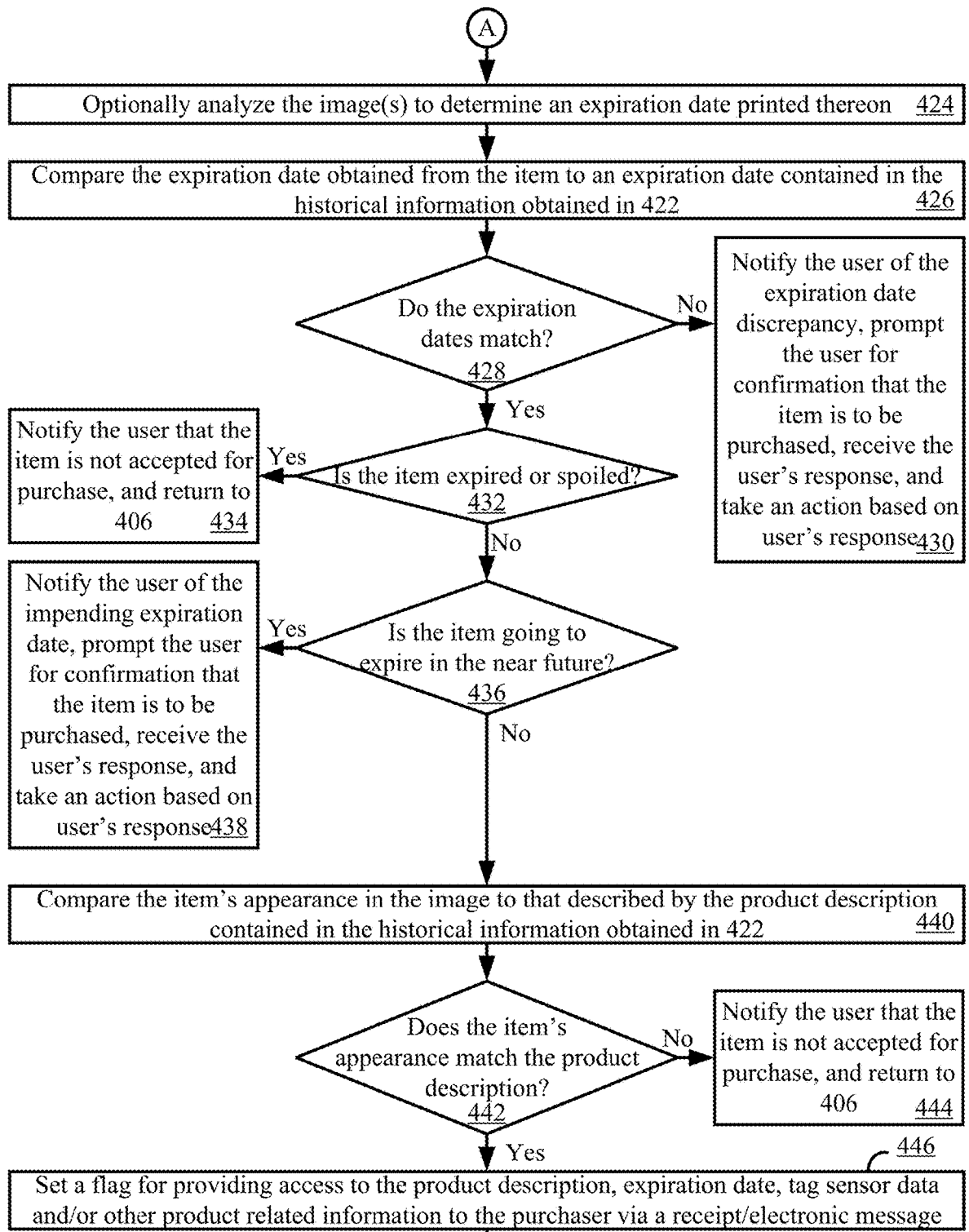

Upon completing 422, method 400 continues with optional 424 of FIG. 4B. As shown in FIG. 4B, 424 involves analyzing the image(s) of the item to determine an expiration date printed thereon. 424 is optional since the item's expiration data can alternatively be obtained via SRCs (e.g., in previous 408). This expiration date obtained from the item is compared to an expiration date contained in the historical information obtained in 422, as shown by 426. If the expiration dates do not match each other [428:NO], then 430 is performed where the user is notified of this expiration date discrepancy. This notification can include, but is not limited to, an electronic message displayed on the display screen (e.g., display 354 of FIG. 3) of the computing device, an auditory sound output from a speaker (e.g., speaker 352 of FIG. 3) of the computing device, and/or a visual indicator provided by an LED (e.g., LED 356 of FIG. 3) of the computing device. The user is also prompted for confirmation that the item is to be purchased. An action is taken by the computing device based on the user's response to the prompt. For example, if the user confirms the item's purchase, then method 400 may continue with 432. In contrast, if the user does not confirm the item's purchase, then method 400 may return to 406 or the purchase transaction is terminated.

In 432, a determination is made as to whether or not the item is expired and/or spoiled. The spoil determination can be made based on sensor data obtained from the security tag. For example, an item is determined to be spoiled when its temperature falls within a predefined range of temperature values, it has been exposed to a high temperature for a given period of time (e.g., 80° F. for two or more hours), it's texture has changed, and/or it's coloration has changed. If so [432:YES], then 434 is performed where the user is notified that the item is not accepted for purchase and where the method 400 returns to 406. This notification can include, but is not limited to, an electronic message displayed on the display screen (e.g., display 354 of FIG. 3) of the computing device, an auditory sound output from a speaker (e.g., speaker 352 of FIG. 3) of the computing device, and/or a visual indicator provided by an LED (e.g., LED 356 of FIG. 3) of the computing device.

If not [432:NO], then method 400 continues with 436. In 436, a determination is made as to whether or not the item is going to expire in the near future. If so [436:YES], then 438 is performed where the user is notified of the impending expiration date. This notification can include, but is not limited to, an electronic message displayed on the display screen (e.g., display 354 of FIG. 3) of the computing device, an auditory sound output from a speaker (e.g., speaker 352 of FIG. 3) of the computing device, and/or a visual indicator provided by an LED (e.g., LED 356 of FIG. 3) of the computing device. The user is also prompted via the GUI to confirm that the item is to be purchased. An action is taken by the computing device based on the user's response to the prompt. For example, if the user confirms the item's purchase, then method 400 may continue with 440. In contrast, if the user does not confirm the item's purchase, then method 400 may return to 406 or the purchase transaction is terminated.

440 involves comparing the item's appearance in the image to that described by the product description contained in the historical information obtained in 422. If the item's appearance does not match the product description [442:NO], then 444 is performed where the user is notified that the item is not accepted for purchase and where method 400 returns to 406. This notification can include, but is not limited to, an electronic message displayed on the display screen (e.g., display 354 of FIG. 3) of the computing device, an auditory sound output from a speaker (e.g., speaker 352 of FIG. 3) of the computing device, and/or a visual indicator provided by an LED (e.g., LED 356 of FIG. 3) of the computing device.

If the item's appearance does match the product description [442:YES], then 446 is performed where a flag is set in a data store (e.g., memory 312 of FIG. 3 and/or datastore 154 of FIG. 1) for providing access to the product description, an expiration date, tag sensor data (e.g., data generated by sensor(s) 262 of FIG. 2) and/or any other product related information to the purchaser via a receipt (e.g., printed or electronic) or electronic message. As known in the art, a flag is set by changing a value of a parameter (e.g., by changing a respective binary value of 0 to 1). Upon completing 446, method 400 continues with 448 of FIG. 4C.

Figure 4C:
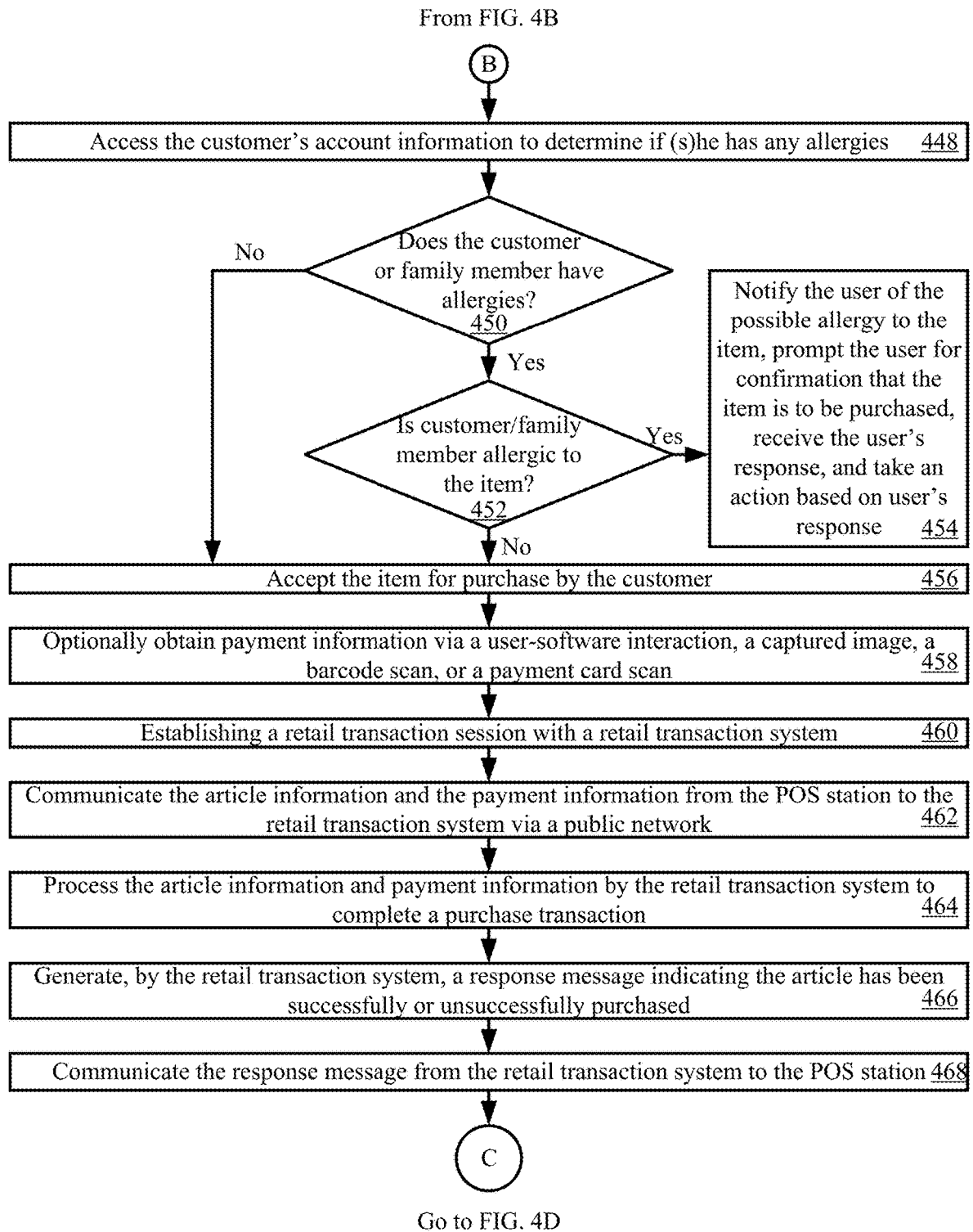

As shown in FIG. 4C, 448 involves accessing the customer's account information to determine if (s)he has any allergies and/or if any of (her)his family members has allergies. If the customer and/or family member(s) does(do) not have allergies [450:NO], then 456 is performed which will be discussed below. In contrast, if the customer and/or family member(s) does(do) have allergies, then method 400 continues with 452. In 452, a decision is made as to whether or not the customer is allergic to the item being purchased. If so [452:YES], 454 is performed where the user is notified of the customer's possible allergy to the item. This notification can include, but is not limited to, an electronic message displayed on the display screen (e.g., display 354 of FIG. 3) of the computing device, an auditory sound output from a speaker (e.g., speaker 352 of FIG. 3) of the computing device, and/or a visual indicator provided by an LED (e.g., LED 356 of FIG. 3) of the computing device. Additionally or alternatively, the notification can be provided to the customer via a personal device such as a mobile phone. In 454, the user is also prompted via the GUI to confirm that the item is to be purchased. An action is taken by the computing device based on the user's response to the prompt. For example, if the user confirms the item's purchase, then method 400 may continue with 440. In contrast, if the user does not confirm the item's purchase, then method 400 may return to 406 or the purchase transaction is terminated.

If the customer is not allergic to the item [452:NO], then 456 is performed where the item is accepted for purchase by the customer. Upon accepting the item for purchase, optional operations 458 are performed where payment information is input into the retail transaction application. The payment information can be input into the retail transaction software via a user-software interaction, a captured image, or a short-range communication (e.g., a barcode scan or a payment card scan). The payment information can include, but is not limited to, a customer loyalty code, payment card information, and/or payment account information. Alternatively or additionally, 458 can involve activating a one-click ordering process where the customer payment information is stored online so that the customer does not have to present a credit card or swipe the card to tender the transaction. Once the one-click ordering process is activated, the user of the computing device can simply press a key on a keypad or touch a button on a touch screen of the computing device for tendering the transaction.

In next 460, the computing device performs operations for establishing a retail transaction session with an RTS (e.g., RTS 118 of FIG. 1). Subsequently, 462 is performed where the article information and payment information is communicated from the computing device to the RTS via a public network (e.g., public network 106 of FIG. 1). At the RTS, the article information and the payment information is processed, as shown by 464. This information is processed by the RTS to complete a purchase transaction.

Figure 4D:
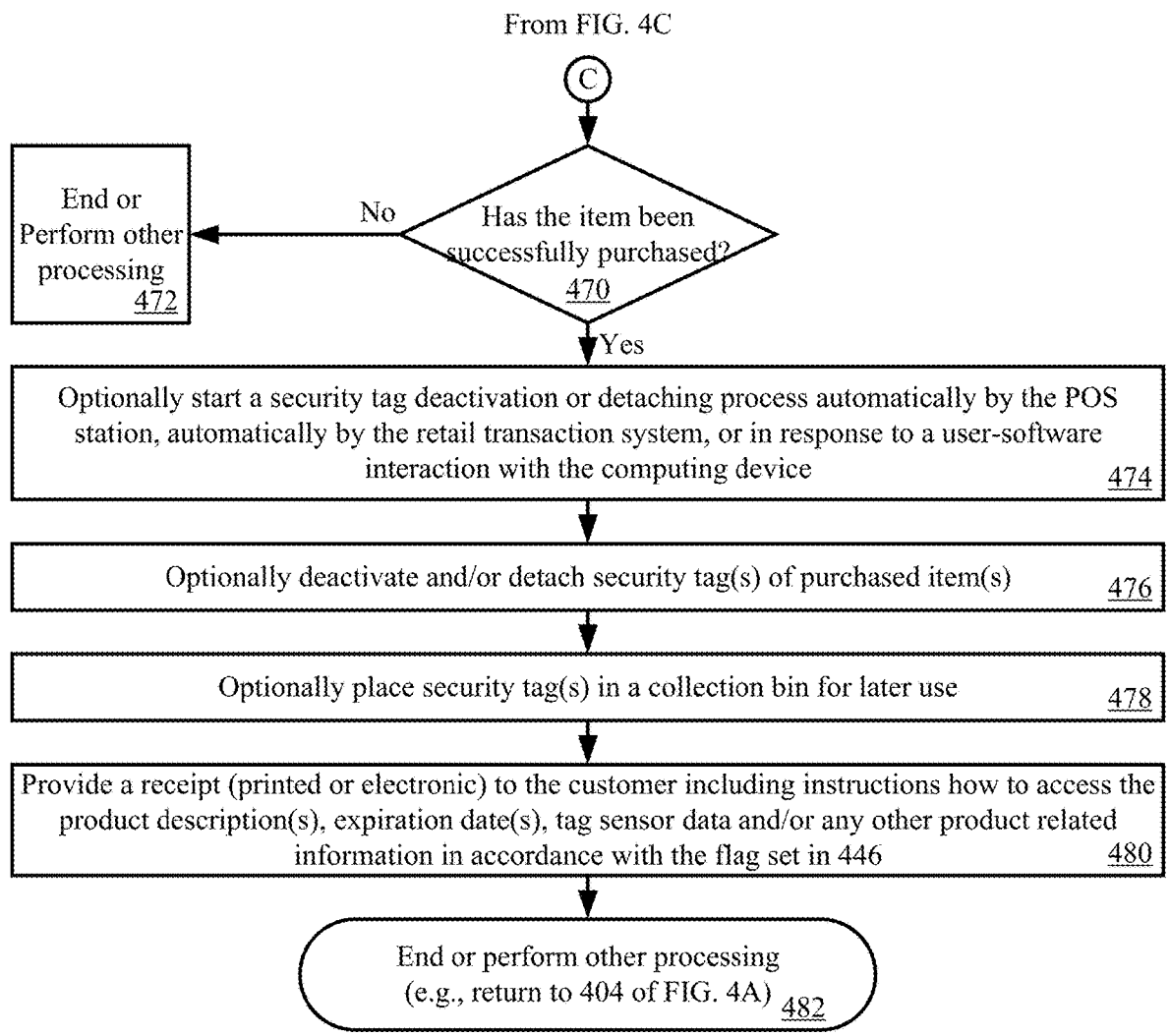

Once the purchase transaction is completed, 466 is performed where a response message is generated by the RTS. The response message indicates whether the articles have been successfully or unsuccessfully purchased. The response message is then communicated in 468 from the RTS to the computing device (e.g., computing device 158) of the POS station (e.g., POS station 104 of FIG. 1). Thereafter, method 400 continues with 470 of FIG. 4D. As shown in FIG. 4D, 470 involves determining if the article(s) was(were) successfully purchased. This determination can be made based on the contents of the response message. If the item(s) was(were) not successfully purchased [470:NO], then 472 is performed where the method 400 ends or other processing is performed. In contrast, if the articles were successfully purchased [470:YES], then optional 474-478 are performed. 474-478 are optional since some articles (e.g., perishable items) may not have a security tag coupled thereto. 474 involves starting a security tag deactivation or detaching process automatically by the POS station, automatically by the RTS, or in response to a user-software interaction with the computing device. Security tag deactivation and detachment processes are well known in the art, and will not be described herein. Any known or to be known security tag deactivation or detachment process can be used herein without limitation. An illustrative security tag detachment process is described in FIGS. 6A-6E of U.S. Pat. No. 8,963,717 to Mohiuddin et al. In 476, the security tag(s) is(are) deactivation and/or detached from the item(s). The detached security tag(s) is(are) placed in a collection bin for later use, as shown by 478.

Next in 480, a receipt (printed or electronic) is provided to the customer. Notably, the receipt includes instructions how to access the product description(s) for the purchased item(s), expiration date(s) for the purchased item(s), tag sensor data, and/or any other product related information in accordance with the flag set in previous 446. Subsequently, 482 is performed where the method 400 ends or other processing is performed (e.g., return to 404 of FIG. 4A).

Figure 5:
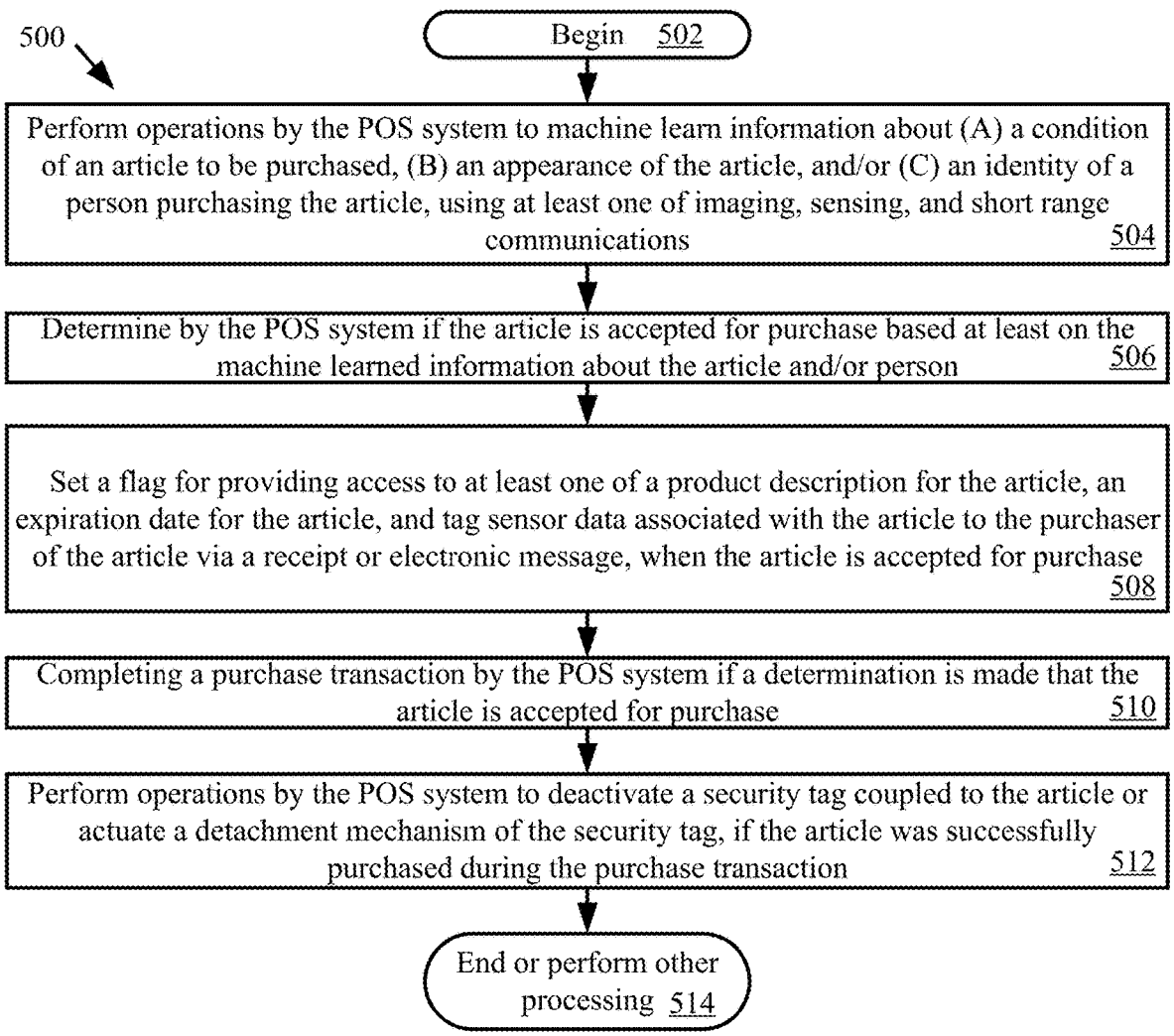
FIG. 5 provides a flow diagram of an illustrative method for operating a Point Of Sale ("POS") system.

Referring now to FIG. 5, there is provided a flow diagram of an illustrative method 500 for operating a POS system (e.g., system 100 of FIG. 1). Method 500 begins with 502 and continues with 504 where the POS system performs operations to machine learn information about (A) a condition of an article (e.g., article 102 of FIG. 1) to be purchased, (B) an appearance of the article, and/or (C) an identity of a person purchasing the article, using at least one of imaging, sensing, and short range communications. In case (A), the machined learned information indicates whether the article is at least one of damaged, expired and spoiled. Next in 506, the POS system determines whether or not the article is accepted for purchase based at least on the machine learned information about (A), (B) and/or (C). For example, in some scenarios, a determination is made that the item is accepted for purchase when the machined learned information indicates that (1) the article is not one or more of damaged, expired and spoiled and/or (2) the article's appearance matches that described by a given product description. Additionally or alternatively, the POS system uses the machine learned information (C) and other information to determine whether the person is allergic to the article. The article is accepted for purchase when a determination is made that the person is not allergic to the article. The present invention is not limited to the particulars of these examples.

If the article is accepted for purchase, then the POS system sets a flag for providing access to at least one of a product description for the article, an expiration date for the article, and tag sensor data associated with the article to the purchaser of the article via a receipt or electronic message, as shown by 508. The POS system also completes the purchase transaction as shown by 510. The purchase transaction may be completed by communicating article information and payment information from a POS station (e.g., POS station 104 of FIG. 1) to a remote transaction system (e.g., RTS 118 of FIG. 1) via a network connection (e.g., established via network 106 of FIG. 1).

In 512, the POS system performs operations to deactivate a security tag (e.g., security tag 132 of FIGS. 1-2) coupled to the article or actuate a detachment mechanism of the security tag, if the article was successfully purchased during the purchase transaction. Subsequently, 514 is performed where method 500 ends or other processing is performed (e.g., return to 504).

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating a Point Of Sale ("POS") system, comprising:
   performing operations, by the POS system, to obtain article information from a label or tag coupled to an article to be purchased;
   performing operations, by the POS system, to machine learn at least information about a physical or chemical condition of the article to be purchased using at least one of imaging, sensing, and short range communications;
   determining by the POS system if the article is accepted for purchase based at least on the article information and the machine learned information about the physical or chemical condition of the article;
   completing a purchase transaction by the POS system if a determination is made that the article is accepted for purchase; and
   performing operations by the POS system to deactivate a security tag coupled to the article or actuate a detachment mechanism of the security tag, if the article was successfully purchased during the purchase transaction.

2. The method according to claim 1, wherein the purchase transaction is completed by communicating article information and payment information from a POS station to a remote transaction system via a network connection.

3. The method according to claim 1, wherein the machined learned information indicates whether the article is at least one of damaged, expired and spoiled.

4. The method according to claim 3, wherein the determination is made that the article is accepted for purchase when the machined learned information indicates that the article is not one or more of damaged, expired and spoiled.

5. The method according to claim 1, further comprising performing operations by the POS system to machine learn an identity of a person purchasing the article.

6. The method according to claim 5, further comprising performing operations by the POS system to determine whether the person is allergic to the article.

7. The method according to claim 6, wherein the article is accepted for purchase when a determination is made that the person is not allergic to the article.

8. The method according to claim 1, wherein the machined learned information specifies the article's appearance.

9. The method according to claim 8, wherein the article is accepted for purchase when the article's appearance matches that described by a given product description.

10. The method according to claim 9, further comprising setting a flag for providing access to at least one of a product description for the article, an expiration date for the article, and tag sensor data associated with the article to the purchaser of the article via a receipt or electronic message, when the article is accepted for purchase.

11. A method for operating a Point Of Sale ("POS") system, comprising:
    performing operations by the POS system to obtain article information from a label or tag coupled to an article to be purchased;
    performing operations by the POS system to machine learn at least information about a physical or chemical condition of the article to be purchased using at least one of imaging, sensing, and short range communications;
    determining by the POS system if the article is accepted for purchase based at least on the article information and the machine learned information about the physical or chemical condition of the article; and completing a purchase transaction by the POS system if a determination is made that the article is accepted for purchase.

12. A POS system, comprising:
a processor;
a non-transitory computer-readable storage medium comprising programming instructions that are configured to cause the processor to implement a method for performing a purchase transaction, wherein the programming instructions comprise instructions to:
obtain article information from a label or tag coupled to an article to be purchased;
machine learn at least information about a physical or chemical condition of the article to be purchased using at least one of imaging, sensing, and short range communications;
determine if the article is accepted for purchase based at least on the article information and the machine learned information about the physical or chemical condition of the article;
complete a purchase transaction if a determination is made that the article is accepted for purchase; and
deactivate a security tag coupled to the article or actuate a detachment mechanism of the security tag, if the article was successfully purchased during the purchase transaction.

13. The POS system according to claim 12, wherein the purchase transaction is completed by communicating article information and payment information from a POS station to a remote transaction system via a network connection.

14. The POS system according to claim 12, wherein the machined learned information indicates whether the article is at least one of damaged, expired and spoiled.

15. The POS system according to claim 14, wherein the determination is made that the article is accepted for purchase when the machined learned information indicates that the article is not one or more of damaged, expired and spoiled.

16. The POS system according to claim 12, wherein the programming instructions comprise instructions to machine learn an identity of a person purchasing the article.

17. The POS system according to claim 16, wherein the programming instructions comprise instructions to determine whether the person is allergic to the article.

18. The POS system according to claim 17, wherein the article is accepted for purchase when a determination is made that the person is not allergic to the article.

19. The POS system according to claim 12, wherein the machined learned information specifies the article's appearance.

20. The POS system according to claim 19, wherein the article is accepted for purchase when the article's appearance matches that described by a given product description.

21. The POS system according to claim 20, wherein the programming instructions comprise instructions to set a flag for providing access to at least one of a product description for the article, an expiration date for the article, and tag sensor data associated with the article to the purchaser of the article via a receipt or electronic message, when the article is accepted for purchase.

* * * * *

UNITED STATES PATENT AND TRADEMARK OFFICE
CERTIFICATE OF CORRECTION

PATENT NO. : 10,694,872 B2  Page 1 of 1
APPLICATION NO. : 16/135872
DATED : June 30, 2020
INVENTOR(S) : Amit R. Patil It is certified that error appears in the above-identified patent and that said Letters Patent is hereby corrected as shown below:

In the Specification

Column 1, Line 48, delete "used to by the" and insert -- used by the --, therefor.
Column 6, Line 32, delete "private network 100" and insert -- private network 136 --, therefor.
Column 6, Line 60, delete "customer" and insert -- customer. --, therefor.
Column 9, Line 55, delete "hardware entities 214" and insert -- hardware entities 314 --, therefor.
Column 9, Line 56, delete "memory 212," and insert -- memory 312, --, therefor.
Column 9, Lines 58-59, delete "Hardware entities 214" and insert -- Hardware entities 314 --, therefor.
Column 9, Line 59, delete "disk drive unit 216" and insert -- disk drive unit 316 --, therefor.
Column 9, Line 60, delete "computer-readable storage medium 218" and insert -- computer-readable storage medium 318 --, therefor.
Column 9, Line 61, delete "instructions 220" and insert -- instructions 320 --, therefor.
Column 9, Lines 63-64, delete "instructions 220" and insert -- instructions 320 --, therefor.
Column 9, Line 65, delete "memory 212 and/or within the CPU 206" and insert -- memory 312 and/or within the CPU 306 --, therefor.
Column 9, Lines 66-67, delete "computing device 200. The memory 212 and the CPU 206" and insert -- computing device 300. The memory 312 and the CPU 306 --, therefor.
Column 10, Line 4, delete "instructions 220." and insert -- instructions 320. --, therefor.
Column 10, Line 7, delete "instructions 220" and insert -- instructions 320 --, therefor.
Column 10, Lines 8-9, delete "computing device 200 and that cause the computing device 200" and insert -- computing device 300 and that cause the computing device 300 --, therefor.
Column 10, Line 33, delete "sweathearting" and insert -- sweethearting --, therefor.

Signed and Sealed this
Eighteenth Day of August, 2020

Andrei Iancu
*Director of the United States Patent and Trademark Office*